United States Patent
Lee et al.

(10) Patent No.: US 8,994,732 B2
(45) Date of Patent: Mar. 31, 2015

(54) INTEGRATION OF SKETCH-BASED INTERACTION AND COMPUTER DATA ANALYSIS

(75) Inventors: Bongshin Lee, Issaquah, WA (US); Nathalie Riche, Seattle, WA (US); Sheelagh Carpendale, Calgary (CA); Tim Sherwood, Santa Barbara, CA (US); Jeffrey Browne, Santa Barbara, CA (US)

(73) Assignee: Microsoft Corporation, Redmond, WA (US)

( * ) Notice: Subject to any disclaimer, the term of this patent is extended or adjusted under 35 U.S.C. 154(b) by 246 days.

(21) Appl. No.: 13/042,415

(22) Filed: Mar. 7, 2011

(65) Prior Publication Data

US 2012/0229468 A1  Sep. 13, 2012

(51) Int. Cl.
*G06T 11/20* (2006.01)
*G06F 9/44* (2006.01)

(52) U.S. Cl.
CPC .................................. *G06F 9/4443* (2013.01)
USPC .......................................... 345/440; 715/863

(58) Field of Classification Search
CPC .. G06T 11/206; G06F 3/04883; G06F 3/0488
See application file for complete search history.

(56) References Cited

U.S. PATENT DOCUMENTS 6,459,442 B1 *  10/2002  Edwards et al. ............... 715/863
7,096,454 B2 *   8/2006  Damm et al. .................. 717/105
7,788,606 B2 *   8/2010  Patel et al. ..................... 715/863
2004/0060037 A1  3/2004  Damm et al.
2006/0045343 A1  3/2006  Tremblay et al.
2009/0278848 A1  11/2009  Robertson et al.
2010/0058201 A1 *   3/2010  Harvey et al. .................. 715/753

OTHER PUBLICATIONS

Olsen, et al., "A Taxonomy of Modeling Techniques using Sketch-Based Interfaces", Retrieved at<<http://pages.cpsc.ucalgary.ca/~olsenl/wiki/uploads/Papers/EGSTAR.pdf>>, EUROGRAPHICS 2008, pp. 19.

Sezgin, et al., "Sketch Based Interfaces: Early Processing for Sketch Understanding", Retrieved at<<http://rationale.csail.mit.edu/publications/Sezgin2001Sketchbased.pdf>>, 2001, pp. 1-8.

Lai, et al., "As Sketchy As Possible: Application Programming Interface (API) for Sketch-Based User Interface Understanding",Retrieved at<<http://ieeexplore.ieee.org/stamp/stamp.jsp?arnumber=05561366>>, Sep. 2, 2010, pp. 6.

(Continued)

*Primary Examiner* — Hau Nguyen
*Assistant Examiner* — Ryan M Gray
(74) *Attorney, Agent, or Firm* — Sandy Swain; Judy Yee; Micky Minhas

(57) ABSTRACT

Architecture that integrates the benefits of natural user interaction such as freeform sketch with computer-aided charting. The architecture integrates natural user interaction utilizing multiple modalities (e.g., sketch, multi-touch, etc.) with computer supported data analysis that allows users to explore data by drawing charts using simple strokes. Natural user interactions can be utilized to change chart types by drawing symbols, transform data by applying functions, filter data by drawing strikethrough on legends, etc. Additionally, the architecture makes an inference of visualizations the user intended from user-drawn strokes, such as the axes of a graph, the words of a label, etc. When appropriate, the architecture automatically completes visualizations.

20 Claims, 9 Drawing Sheets

(56) References Cited

OTHER PUBLICATIONS

"Functions & Data Analysis Tools", Retrieved at<<http://www.techdocs.ku.edu/docs/excel_2000_functions.pdf>>, 2003, pp. 1-18.

Kara, et al., "SimUSketch: A Sketchbased interface for Simulink", Retrieved at<<http://citeseerx.ist.psu.edu/viewdoc/download-?doi=10.1.1.10.3416&rep=rep1&type=pdf >>, May 25-28, 2004, pp. 354-357.

"Data Analysis Software and Tools", Retrieved at<<http://www.informationbuilders.com/data-analysis.html>>, Retrieved date: Oct. 19, 2010, pp. 3.

Apitz, et al., "CrossY: A Crossing-Based Drawing Application", Retrieved at<<http://www.cs.umd.edu/alandaluz/crossy/CrossY_finale.pdf>>, Oct. 24-27, 2004, pp. 1-10.

Gross, et al., "Ambiguous Intentions: A Paper-like Interface for Creative Design", Retrieved at<<http://depts.washington.edu/dmgftp/publications/pdfs/uist96-mdg.pdf>>,1996,pp. 183-192.

Landay, et al., "Interactive Sketching for the Early Stages of User Interface Design", Retrieved at<<http://citeseerx.ist.psu.edu/viewdoc/download;jsessionid=4D4D6C63DDF5F09E-75064665C43C97E6?doi=10.1.1.30.8570&rep=rep1&type=pdf>>,1994, Technical Report, pp. 9.

"Microsoft Excel 2010", Retrieved at<<http://office.microsoft.com/en-us/excel>>, Oct. 19, 2010, pp. 2.

Mynatt, at al., "Flatland: New Dimensions in Office Whiteboards", Retrieved at<<http://citeseerx.ist.psu.edu/viewdoc/download-?doi=10.1.1.40.3198&rep=rep1&type=pdf>>, 1999, pp. 8.

La Viola, et al., "MathPad2: a system for the creation and exploration of mathematical sketches", Retrieved at <<http://citeseerx.ist.psu.edu/viewdoc/download?doi=10.1.1.70.3882&rep=rep1&type=pdf>>, Special Interest Group on Computer Graphics and Interactive Techniques, Aug. 8-12, 2004, pp. 9.

Pederson, et al., Tivoli: An Electronic Whiteboard for Informal Workgroup Meetings, Retrieved at<<http://www.dtic.upf.edu/~jblat/material/hci/2008/07contributions/TIVOLI_MarcoRomeo.pdf>>, 1993, pp. 11.

Shneiderman, Ben, "Direct Manipulation: A Step beyond Programming Languages", Retrieved at<<http://ieeexplore.ieee.org/stamp/stamp.jsp?tp=&arnumber=1654471>>, Aug. 1983, pp. 13.

"Tableau", Retrieved at << http://www.tableau.com >>, Retrieved Date: Oct. 19, 2010, p. 1.

Tenneson, Dana, "ChemPad: A Pedagogical Tool for Exploring Handwritten Organic Molecules", Retrieved at<<http://graphics.cs.brown.edu/research/chempad/chempadpaper05.pdf>>, Nov. 2006, pp. 7.

Wattenberg, Martin, "Sketching a Graph to Query a Time-Series Database", Retrieved at<<http://citeseerx.ist.psu.edu/viewdoc/download?doi=10.1.1.87.6854&rep=rep1&type=pdf>>, CHI '01 extended abstracts on Human factors in computing, 2001, pp. 3.

Zeleznik, et al., "Fluid Inking: Augmenting the Medium of Free-Form Inking with Gestures", Retrieved at<<http://pen.cs.brown.edu/fluid.pdf>>, In GI '06: Proceedings of Graphics Interface 2006 (2006), pp. 155-162.

* cited by examiner

INTEGRATION OF SKETCH-BASED INTERACTION AND COMPUTER DATA ANALYSIS

BACKGROUND

Information visualization systems focus on the common technical setup of a mouse, a keyboard, and a desktop display. This practice of providing visualization support only for solo desktop work ignores other exploratory phases of information work, such as preliminary sketching (on papers or whiteboards) to work out ideas and approaches to analyzing the data.

The use of paper and whiteboards among information workers is ubiquitous. Ideas, problems, and planning are oftentimes worked out initially in an informal venue. However, if the information work involves large amounts of data, it is soon necessary to make use of computational power in some tools (e.g., a spreadsheet).

Despite its familiarity and inherent benefits, the traditional whiteboard is fundamentally limited by its passive nature. All content shown must be drawn directly. For example, if charts and graphs are employed to show data, each data item must be drawn by hand. Thus, data charts on whiteboards tend to be relatively simple since drawing many data points one-by-one is tedious even for the cases where accuracy is not critical. Data-rich problem solving on a whiteboard can either be exceptionally tedious, or result in using partial or merely indicated charts and graphs.

In addition, sketched data accuracy is challenging and the quality of the plots is limited by memory; only general trends can be drawn from recollection to any real extent. Hand drawn charts are also limited in that useful functions on data are not easily estimated. Standard deviation, cardinality, and even arithmetic mean can be difficult to estimate with any accuracy, but are vital tools in the initial steps of data analysis. In other words, there is a big gap between what people think and draw on whiteboards and how people can manipulate data in the computer.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture integrates the benefits of freeform sketch-based interaction with computer-aided data analysis and processing, at least in support of charting. A user can apply a simple sketched mark (also called a stroke) to an interactive component (e.g., a whiteboard), and then one or more strokes are processed to suggest a graphical representation (e.g., a chart, arrow) that is then generated and presented proximate, alone or in combination with the applied stroke for viewing via the interactive component. The generated graphical representation need not be beautified by the computing system, but be the same or similar to the hand-based stroke the user applied. In response, the architecture can plot items on the chart populated from a user dataset.

By drawing (applying one or more strokes) on the resulting graph, the user interacts with the user's own data, changing the resulting visualization dynamically, leading to a more fluid and less intrusive experience. Thus, the user can readily explore the data visually through the use of graphical representations such as scatter plots and bar charts. Moreover, analysis is easily accomplished through the application of functions to the user data. Sketch-based interactions can be utilized to change chart types (e.g., by drawing symbols), transform data (e.g., by applying functions), filter the data (e.g., by drawing a strikethrough on a legend item), etc. Additionally, the architecture makes an inference of visualizations the user intended from user-drawn strokes, such as the axes of a graph, the words of a label, etc.

By targeting more of quantitative analysis and data exploration, these principles enable non-expert users, for example, to rapidly explore the data in its visualization.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
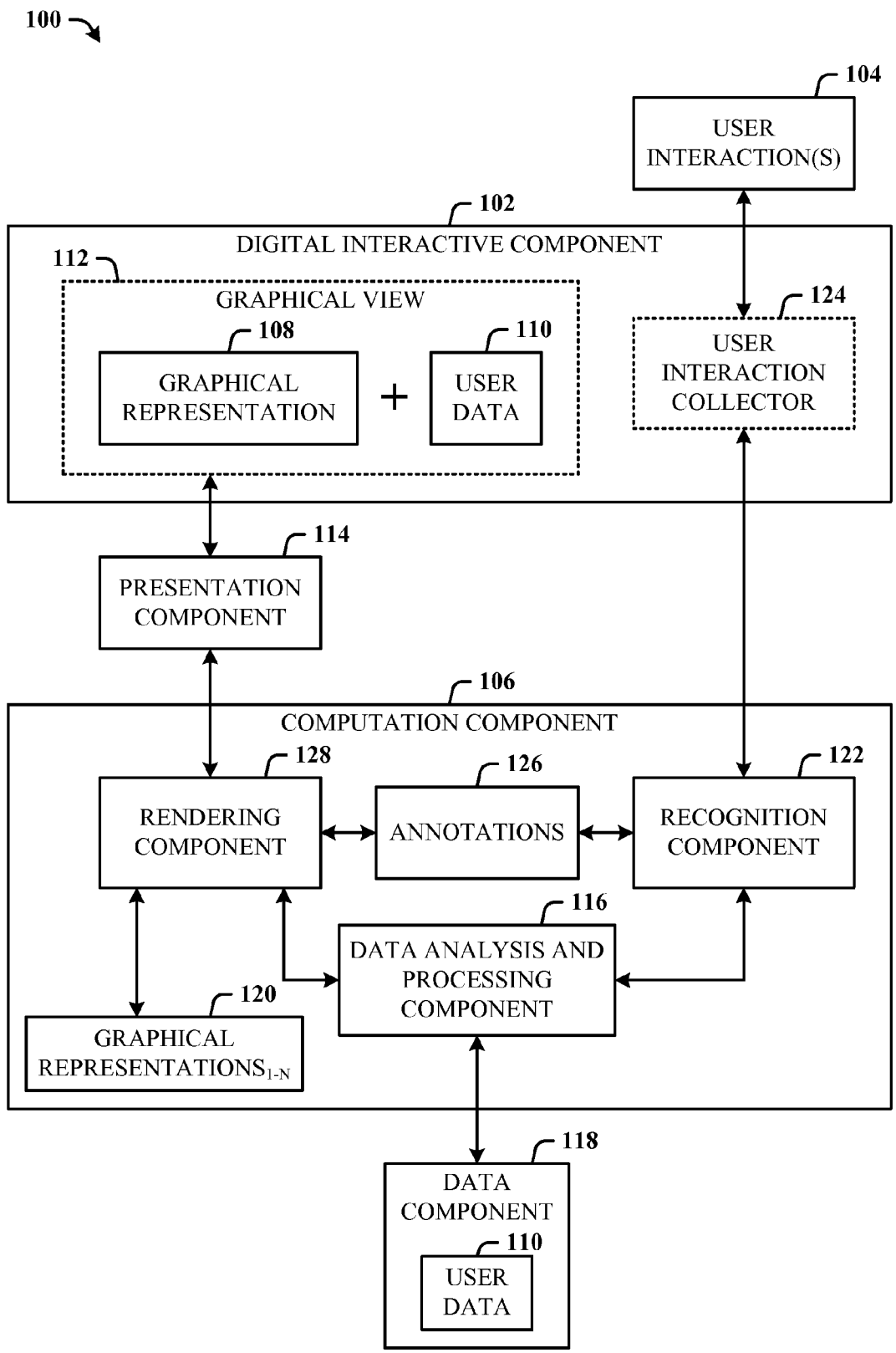
FIG. 1 illustrates a computer-implemented interactive system in accordance with the disclosed architecture.

The disclosed architecture combines the casual sketching approach of paper or whiteboards with a computer's computational power to provide data exploration capabilities of computer-aided data visualization. The hand drawn appearance can be preserved and, alternatively or in combination therewith, the drawing can be processed into a more polished result. The strokes can be processed as vector entities to be fully recognizable and functional. An auto-complete functionality is supported as well.

The architecture supports multiple ways to sketch visualizations. Moreover, alternative interaction approaches are provided. For example, to specify axes for a chart, the user can draw axes and specify the axes via a handwritten axis label, draw axes and specify the axes via placing one or two data points (with data point values for each axis), and/or draw axes and specify the axes via placing and labeling tic marks with values. Tailored data views can also be provided so the user can preview data before the user starts the draw process.

The architecture can also provide suggestions and recommendations from available data in a nonintrusive manner. Additionally, gesture and visualization auto-complete functionality can be provided where appropriate.

The architecture supports sketch-based methods for users to perform a set of actions that are common in data exploration. Examples include adjusting range/scale for each axis, applying functions (e.g., average, standard deviation, minimum, maximum, count, etc.) without having to re-draw the visualization, sorting/reordering, filtering, etc. In addition, the architecture provides ways to specify visual variables such as color and shape, as well as providing seamless switching between different views and different chart types (or visualizations).

The architecture can also provide ways to access to data incrementally, rather than showing the entire dataset. Thus, the user can start with a subset of the data of interest and incrementally request more data. The architecture can also assist in workflow by seamlessly performing peripheral tasks such as tracking history, forking exploration, and showing multiple visualizations for comparison, etc.

Recognition can be operationally harmonized. Linked and re-usable APIs provide seamlessly handling of the range of input modalities (e.g., pen and multi-touch) and the gestures, strokes, hand postures, and symbolic characters generated.

When using charts, for example, a user can apply simple sketched marks such as lines, arcs, etc., (also referred to as strokes—the fundamental objects of the architecture) to suggest a chart to view. In response, the architecture can plot and render items on the chart populated from user data. By further interacting (e.g., drawing) with the chart users can interact with the data, and changing the resulting visualization on-the-fly, thereby leading to a more fluid and less intrusive experience.

In one implementation, a digital whiteboard is produced that emulates a traditional whiteboard, yet allows multiple, disjoint ideas (e.g., sketches) to appear on the board concurrently. Thus, a single user can interact with one or more charts/graphs, for example, or multiple users can interact collaboratively with one or more charts/graphs. Another example implementation can utilize a tablet PC for individual data exploration or even multiple user interaction, if desired.

In contrast to traditional systems that employ the notion of modes, the disclosed architecture permits all applications to interpret strokes independently and concurrently. The architecture observes (recognizes) user strokes and uses that knowledge to provide a service. In one implementation, the architecture is strictly stroke-driven in that there are no or minimal menu bars utilized on (e.g., around the outside of) the screen. However, this is not to be construed as limiting in any way, since other suitable user input technologies can be employed. For example, drawn strokes such as the axes of a graph or the words or letter of the user input are observed (received and recognized), and visualizations the user intended from this are inferred to complete the graphical representation (e.g., chart).

Although described herein primarily with user input as being stroke-based, it is to be understood that other input modalities that facilitate user interaction can be employed separately or in combination therewith, such as via menus and touch-based interaction.

The architecture provides users with a user input interface (e.g., sketch-based, pen-based, touch-based, etc.) operating in combination with computer-aided analysis to visually explore user data. Once user input is received, the architecture recognizes and computer-generates graphical objects associated with the input. For example, if the input is one or more user strokes (e.g., line with arrowhead) applied as marks (e.g., using a marker pen) to a whiteboard surface, the one or more strokes can then be recognized and rendered as a graphical object that is an arrow. This arrow graphical object can then be presented proximate the user-applied stroke in a cleaned-up version or as a captured rendition (image) of the user-applied stroke.

The architecture encourages collaborative data exploration through user inputs that include the user sketching or introducing strokes to a visualization interface (also referred to as a digital interactive component). Sketched lines and handwritten text can be easily erased or modified. Moreover, the architecture encourages users to explore data in different perspectives and thereby discover novel insights. Thus, strokes drawn by users can be maintained in the view to encourage erasure and modification.

Collaboration is facilitated such that multiple users can apply strokes, which are then dynamically processed to present the associated graphical objects, and to then operate on the user data under inspection. In the context of a large drawing surface such as a pen-based interactive display, for example, collaboration is supported using multiple active pens, where the pens provide a tool for interacting with a pen-based interactive visualization surface. Since people already use whiteboards in discussions and presentation contexts, the disclosed data exploration interactive architecture enhances the naturally collaborative environment familiar to users.

The disclosed architecture provides for direct manipulation (interaction) to not only minimize the cost (e.g., time) of creating new charts and modifying existing charts, but also to expedite the learning curve for novice users. Existing techniques using a spreadsheet, for example, require multiple steps, including the selection of the proper menu items and performing multiple selections to configure chart parameters. In contrast, the disclosed architecture enables direct user interaction without complex menu navigation, and emulates activities normally associated with sketching a chart on a whiteboard, for example.

The freeform nature of the architecture interface enables users to draw whatever may be conceived in as much or as little detail as desired. The user can visualize charts to express expected trends as well as to present existing trends as observed in the data. Quick sketches allow users, individually or collaboratively, to rapidly and simply try different options, discover correlations and outliers, and filter and summarize the data.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a presentation system 100 in accordance with the disclosed architecture. The system 100 includes a digital interactive component 102 that receives user interaction 104 and processes the user interaction 104 as a stroke. It is to be understood that the stroke can be the result of many different types of input modalities as mentioned above. A computation component 106 (e.g., computer-based component separate from the interactive component 102) interprets the user interaction 104 (e.g., stroke) as related to a graphical representation 108 (e.g., arrow, chart, legend, etc.), and optionally, performs an operation on user data 110 based on the stroke, to create an overall graphical view 112 of the user data 110 and the graphical representation 108 which can be in combination with the applied stroke. The computation component 106 can also manage (e.g., retrieve and generate) annotations as described herein.

The user data 110 is shown as the graphical representation 108 to simply convey that the qualitative and/or quantitative information user data 110 can be characterized by the graphical representation 108 that can be a set of graphical objects. In an alternative implementation, it is within contemplation of the disclosed architecture that the some or all of the user data under observation can be presented in its raw or tabular form, separately or in combination with the graphical representation 108 via the interface component 102.

The graphical representation 108 can be provided by the computation component 106 as comprising one or more graphical objects (e.g., the axes of a chart, tic marks, etc.). For example, where the user input is a raw stroke (e.g., hand sketched on a whiteboard surface using marker pen) intended to be an arrow, the computation component 106 can capture this input and render the same stroke as a graphical object in the graphical view 112. Thus, the raw stroke can be rendered in its rough (captured as a freeform unstraightened, unsymmetrical, etc.) format as manually created by the user, proximate to the raw stroke on the board surface.

Alternatively, the raw stroke can be presented as "cleaned-up" (e.g., straight, symmetrical at the points, etc.) arrow object by the computation component 106 retrieving a predetermined and stored arrow object that is accessed and then presented in the graphical view 112. In any case, the resulting graphical view 112 can include only the raw stroke, only the rough stroke, only the cleaned-up stroke, or any combination thereof.

A presentation component 114 receives rendering information from the computation component 106 and presents this rendering information in the graphical view 112 as comprising the stroke (rough or cleaned-up), labels, lists, and other graphical objects, interactive or otherwise, in association with the digital interactive component 102. In other words, the graphical view 112 can be projected onto the interface component 102, which can be a digital whiteboard, by a projector, which is the presentation component 114.

Where the interactive component 102 is a pen-based display or touch-based display, for example, the presentation component 114 can be part of the computation component 106 or part of the display such that the graphical view 112 can be presented via the display capabilities of the pen-based or touch-based display.

The computation component 106 can include a data analysis and processing component 116 that can access the user data 110 through a data component 118. The data component 118 can be a database on a server, distributed database, files on a local client, in-memory data, etc., that makes available the user data 110 (e.g., dataset) for manipulation and interaction via one or more of graphical representations 120 (e.g., the graphical representation 108). In yet another implementation, the data component 118 can be part of a cloud computing infrastructure.

The graphical objects are the objects used to digitally render or display a chart axis, tic marks on an axis, text, dimensions, a captured user stroke, a box, a line, etc. The graphical objects can change and/or update based on one or more of the user interaction(s) 104. In contrast, the user data 110 is the data which the user desires to examine (e.g., sales data, financial data).

With respect to user interaction, if the user interaction 104 is to change the scale on the y-axis of a graphical representation such as a chart, the data analysis and processing component 116 adjusts the scaling of an axis according to a stroke that the user applies to an axis. Additionally, the data analysis and processing component 116 processes the dataset (user data 110) under inspection by the user according to the new user interaction 104.

Note that graphical objects can be associated with an application (e.g., charting program, operating system) that provides the capability to perform graphic and charting generation and manipulation, as well as to provide extensibility to add new options for processing and presenting new graphical representations.

As previously described, the digital interactive component 102 (e.g., active or passive visualization surface) can be a digital whiteboard, interactive display surface, touch surface, pen-based surface, or simply a computer monitor via which the user interacts using a mouse or other pointer-driven user input device, for example, and include the appropriate software (e.g., presentation, operating system, charting/graphing, etc.) to assist the particular digital interactive component 102 to recognize and process the user interaction.

The data analysis and processing component 116 (e.g., a computer subcomponent) performs data analysis by applying data analysis functionality (e.g., operations that includes function(s), delete, filter, mathematical operations, scale, etc.) on the user data 110 in response to the user interaction 104. For example, if the user applies a stroke to the y-axis of a chart that then is inferred by the system 100 to establish the scaling for that axis, the system 100 automatically applies the remaining tic marks for the y-axis. The data analysis and processing component 116 then automatically performs data analysis on the dataset under inspection (the user data 110) to fit the chart (the graphical representation 108).

The presentation component 114 (e.g., projector system, display surface, touch surface, pen-based surface, etc.) presents the one or more graphical objects in association with the graphical representation 108 as changed by the operation. In one implementation, the user interaction 104 is captured and interpreted from the digital interactive component 102 which is a whiteboard, and then once processed (e.g., inferred) to determine the user intended to draw a graph, the resulting graphical objects are then projected (by a video or camera system) onto the whiteboard for visualization by the user and other viewers in accordance with characterizing the user data 110 according to the desired dimensions and formats.

In another example, the user interaction 104 is captured and interpreted from the digital interactive component 102 which is a touch-based surface or display, and then once processed (e.g., inferred) to determine the user intended to draw a graph, the resulting graphical objects are then presented via the touch-based device (display) for visualization by the user and other viewers (local and/or remote) in accordance with characterizing the user data 110 according to the desired dimensions and formats.

Note that the graphical representation 108 is just one of many of the graphical representations 120 that can be employed and utilized. For example, the graphical representation 108 can be a bar chart, scatter plot, polar coordinate graph, etc. Additionally, the number and type of representations and associated strokes can be extensible to add new strokes and corresponding representations for use.

The system 100 provides the capability of auto-completion of the graphical representation 108 and auto-completion based on user interaction(s) 104 to the graphical representation 108. In other words, the user interaction 104 can suggest the graphical representation 108, which can be an arrow, axes of chart, bar, etc. Note that in a touch-based interface the user interaction 104 can comprise a single touch or multi-touch gestures that can be combined with hand postures, for example.

The computation component 106 can comprise a recognition component 122 that receives the one or more interactions (e.g., strokes) from a user interaction collector 124, which can be a component that receives the user interaction(s) 104 as applied (input) by the user(s). The recognition component 122 recognizes the interaction and generates a result that facilitates the presentation of the graphical representation 108 suggested by the interaction.

The recognition component 122 employs one or more recognizers that process the user interaction 104 for the graphical representations 120 such as arrows, charts, etc. Additionally, the recognition component 122 handles annotations 126 (internally) associated with the graphical representations 120. An annotation is a passive data collection associated with an interaction (e.g., stroke). The user does not interact with an annotation. The annotation performs basic transformations of its underlying data (e.g., an arrow annotation may retrieve the "object" at which the arrow annotation points). User interaction 104 first passes through the recognizers of the recognition component 122, which recognizers in turn may modify annotations 126. During a redraw event, renderers of the rendering component 128 read this information and display it.

A rendering component 128 includes different renderers for rendering data in the annotations 126. The rendering component 128 can include different renderers for different graphical representation types (e.g., chart, arrows, bars, legend, label menu, etc.). Although depicted as part of the computation component 106, the recognition component 122 and rendering component 128 can be implemented external thereto. For example, the rendering component 128 can be part of the presentation component 114.

The user interaction(s) 104 can include many different types of interactions (e.g., strokes) such that when processed present the corresponding user data 110 as part of a new or updated graphical representation (of the graphical representations 120).

The recognition component 122 adds an annotation (of the annotations 126) in combination with the graphical representation 108. The interactive component 102 allows the user interaction 104 to be applied directly to a visualization interface (e.g., display surface, whiteboard, etc.) by a user. The stroke can be a freeform stroke (sketch-based) input by a user (e.g., marker pen, digital pen, touch, etc.) and recognized for completion of the graphical representation 108 by the recognition component 122. This auto-completion feature applies equally well to other user input modes described herein, such as for touch-based inputs, pen-based inputs, etc.

The sketch-based interactions can change the graphical representation 108 based on symbols, transform the user data 110 by applying a function, and filter the user data 110 by removing an item of a legend from consideration (e.g., by applying a strikethrough stroke over the legend item). The user interaction 104 can comprise multiple input strokes that are processed to operate on the graphical representation 108 and associated user data 110 or generate a new graphical representation that characterizes the user data 110 in a different visual way.

The digital interactive component 102, data analysis and processing component 116, recognition component 122, rendering component 128, and presentation component 114 facilitate the receipt, processing, and presentation of multiple concurrent user interactions, associated suggested annotations to be retrieved for the multiple concurrent user interactions, and corresponding graphical representations.

The user interaction 104 can be interpreted to change the graphical representation 108 based on symbols, transform the user data 110 by applying a function, and filter the user data 110 by deleting a menu item from consideration (using a strikethrough stroke as the user interaction 104). The user interaction 104 can be a freeform stroke applied directly by a user to the digital interactive component (e.g., a touch-based surface, pen-based surface, etc.).

The user interaction 104 can comprise multiple interactions (from a single user or multiple users) which include a second stroke that when processed presents the user data 110 as part of a new graphical view suggested by a combination of the stroke and the second stroke. The user interaction 104 can comprise multiple strokes from multiple users that are processed concurrently to operate on the graphical view 112 and associated user data 110 or to generate new graphical view of the user data 110. The presentation component 112 projects user data as characterized by the graphical representation 108 and a menu item onto the digital interactive component 102 in realtime in response to the user interaction 104.

Figure 2:
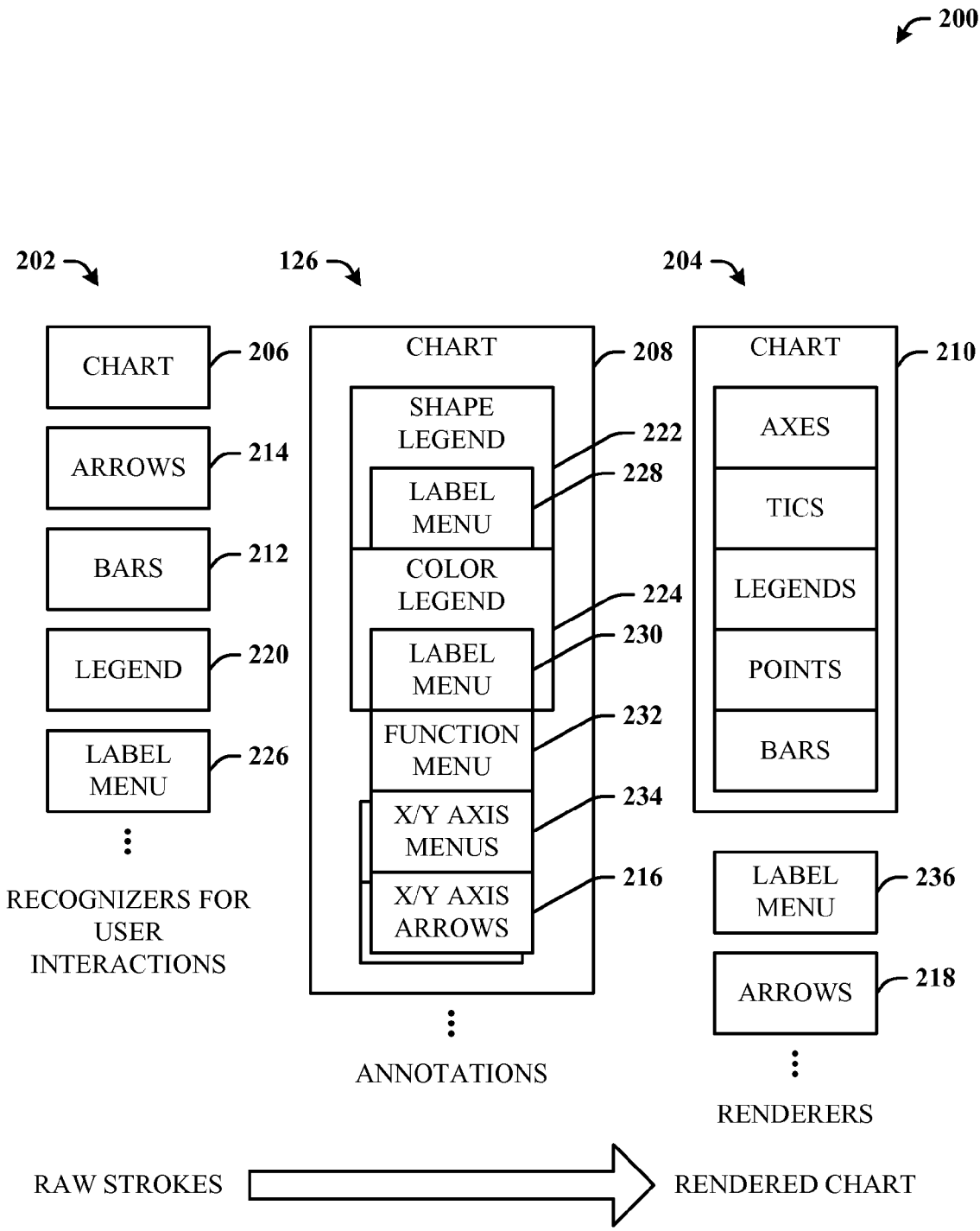
FIG. 2 illustrates a more detailed embodiment of a sketch-based interactive computer-based data analysis system in accordance with the disclosed architecture.

FIG. 2 illustrates a more detailed embodiment of an exemplary sketch-based interactive computer-based data analysis system 200 in accordance with the disclosed architecture. It is to be appreciated that this is just one example embodiment. Alternative embodiments can include different types of recognizers 202, different types of annotations 126, and chart/graph components 204 (e.g., axes, points, bars, etc.). The system 200 can be constructed and applied as a form of "blackboard" system with sets of recognizers 202 (as part of the recognition component 122) that add information to the system during operation. The recognizers 202 monitor (directly or indirectly) one or more incoming strokes of particular types (e.g., a delete stroke) and add annotations 126 based on stroke structure. Renderers 204 (of the rendering component 128) render the data in the annotations to the screen or interactive surface (e.g., whiteboard).

Information can be provided as the annotations 126, which annotations 126 are then associated with sets of strokes (e.g., pen-based). As strokes are added to the board (visualization surface, component, or interface), relevant features (e.g., arrow) are recognized, and appropriate annotations are added. Likewise, as strokes are erased (removed from consideration), the system 200 deletes the relevant annotations and ensures that the state of the system 200 is consistent with the erasure.

The recognizers 202 can include a chart recognizer, arrow recognizer, bar recognizer, legend recognizer, and label menu recognizer, just to name a few. The chart annotations 126 include, but are not limited to, a shape legend, label menu, color legend, function menus, axes menus, axes arrows, and so on. The rendered chart (graphical representation 108) can include as set of graphical objects such as axes, tic marks, legends, points, bars, one or more label menus, arrows, and so on.

In one implementation, a registry of the recognizers 202 can be maintained along with a formal description of the patterns associated with the recognizers. Alternatively, each recognizer can implement its own patterns arbitrarily, and hence, there is no global description repository utilized. The recognizers 202 "listen" for updates to the system, whether the updates are new strokes (drawn by the user) or new annotations (added by other recognizers). When a stroke is added to the board (visualization surface), all listening recognizers are notified so that each recognizer can check in turn if the stroke matches the type of item that the recognizer is looking for.

A single stroke may trigger several stroke recognizers 202 and be matched successfully by all of the recognizers 202. Thus, strokes can have multiple overlapping annotations 126 as well. For example, strokes may be interpreted as an arrow as well as the letter "t." In the case where these interpretations coexist, the ambiguous interpretation is left alone. When one interpretation excludes the other, higher level recognizers may remove a conflicting annotation (e.g., arrows recognized as axes are stripped of any textual annotations). Once an update occurs, it is up to the recognizers 202 to modify the annotations 126 appropriately to ensure that the underlying meaning of each annotation matches the strokes on the board.

Several different annotations 126 on strokes can be maintained by the recognizers 202, including, but not limited, to the following. Additionally, the following are but some examples in which the strokes can be implemented.

Arrows: users can begin the charting process by drawing two arrows (each input individually) for axes. In one design, single-stroke arrows can be utilized for performance reasons. Arrow annotations 126 are maintained by an arrow recognizer, which "listens" (or observes) for raw strokes shaped like arrows.

Charts: upon recognizing two (nearly) intersecting arrows as axes, the system creates a chart annotation for that chart. Within this structure is stored the semantic information for the chart, including the backend data sets loaded by the user, logical placement of x- and y-axis tic marks on the axes, and which columns are loaded into which axes. The chart annotation is created by a specific recognizer that listens only for intersecting arrows, but once instantiated, it is managed by its own chart recognizer that listens for axis tics (raw strokes) and axis label (text menu/legend annotation) updates. As users add strokes to the system, the strokes are annotated internally as needed, and the results cascade up to the encompassing chart annotation. By handling multiple chart annotations independently, users are allowed to draw any number of charts that will fit on the screen (visualization surface or interface component).

Axis Legends: Created with each chart annotation are two legend annotations, one each for the color and shape axes. These data structures hold data about which data column is selected for that axis (through a label menu annotation) as well as filters applied to that column's data. These annotations are kept up-to-date by the legend recognizer that listens for raw strokes that cross out values populated from the column, and changes to label menu annotations that modify which data column is selected for that axis.

Label Menus: label menu annotations can have two forms. The first and simplest form defines an area for text entry. As users write in the area, the associated label menu recognizer monitors the resulting text annotations (e.g., as returned from queries to libraries), and chooses the first partial match among the possible options. For example, given a list of column names (e.g., "Country," "Population," "Year") as options, the label menu sets its choice as "Country" as soon as a set of strokes are annotated as "C," "CO," "COU," etc. A second type of label menu displays the list of available options below the text entry area. Users may then circle the option the user desires to select. With this type of label menu, the menu recognizer also listens for raw strokes that circle options. Once an option is circled, the recognizer updates the annotation by setting its choice. A third type can incorporate a combination of the other two such that as the user writes text, the system shows a list of column names that matches (i.e., contains) the entered text.

Bars: when a user draws a bar-shaped stroke on the visualization surface or interface, a listening bar recognizer creates a bar annotation. The chart recognizer then checks whether the bar defined in that annotation crosses (intersects) the x-axis, and changes its chart annotation to a bar chart if the intersection exists.

While the recognizers 202 update and manage the underlying data of annotations, the renderers 204 have the task of displaying to the user the state defined in the annotations 126. Each annotation/recognizer defines a method of interaction, the details of which are communicated to the user by changing the look of the board. Rendering can be restricted to adding graphics to the board (without removing or cleaning up user strokes) in order to encourage users to modify the charts through the previous strokes.

The chart rendered overlays straight lines over the user-drawn axes and tic marks, and draws colored points/symbols/bars at the correct position on the board. It then calls label menu and legend renderers to print text from the recognized results of handwriting in the text entry areas of the chart.

The recognizers 202 can be associated with specific annotations 126 and renderers 204. For example, a chart recognizer 206 can have a chart annotation 208 and a chart renderer 210 (that rendered axes, tics, legends, points, and bars, for example). Similarly, a bars recognizer 212 can have the same chart annotation 208 and a chart renderer 210. An arrows recognizer 214 can have an x/y axis arrows annotation 216, and arrows renderer 218. A legend recognizer 220 can have a shape legend annotation 222 and a color legend annotation 224. A label menu recognizer 226 can have a shape legend label menu annotation 228, color legend label menu annotation 230, function menu annotation 232, and an x/y axis menus annotation 234, as well as a label menu renderer 236. As shown, these are only but a few of the possible recognizers, annotations, and renderers that can be employed.

Put another way, an interactive system is disclosed that includes a digital interactive component that receives user interaction as a stroke applied directly thereto, a recognition component that recognizes the stroke and manages an annotation associated with a set of strokes, a rendering component that renders state defined in an annotation, a data analysis and processing component that performs an operation on user data based on the graphical representation to create a graphical view of the user data, and a presentation component that presents the graphical view of the user data in association with the stroke and the digital interactive component.

The presentation component can project the graphical view, and a characterization of the user data based on the graphical representation onto the digital interactive component in realtime response to the user interaction. The user interaction can be a freeform stroke that suggests at least one of a chart, graph, arrow, legend, menu, scaling, filtering, colorization, data transformation, or erasure. The user interaction is interpreted and recognized to enable analysis of the user data. The user interaction is processed to enable change of the graphical representation based on symbols or gestures, transformation of the user data via a function, and filtering of the user data, etc. The user interaction can comprise multiple sketch-based strokes applied to the digital interactive component and recognized concurrently to create corresponding suggested graphical representations.

Figure 3:
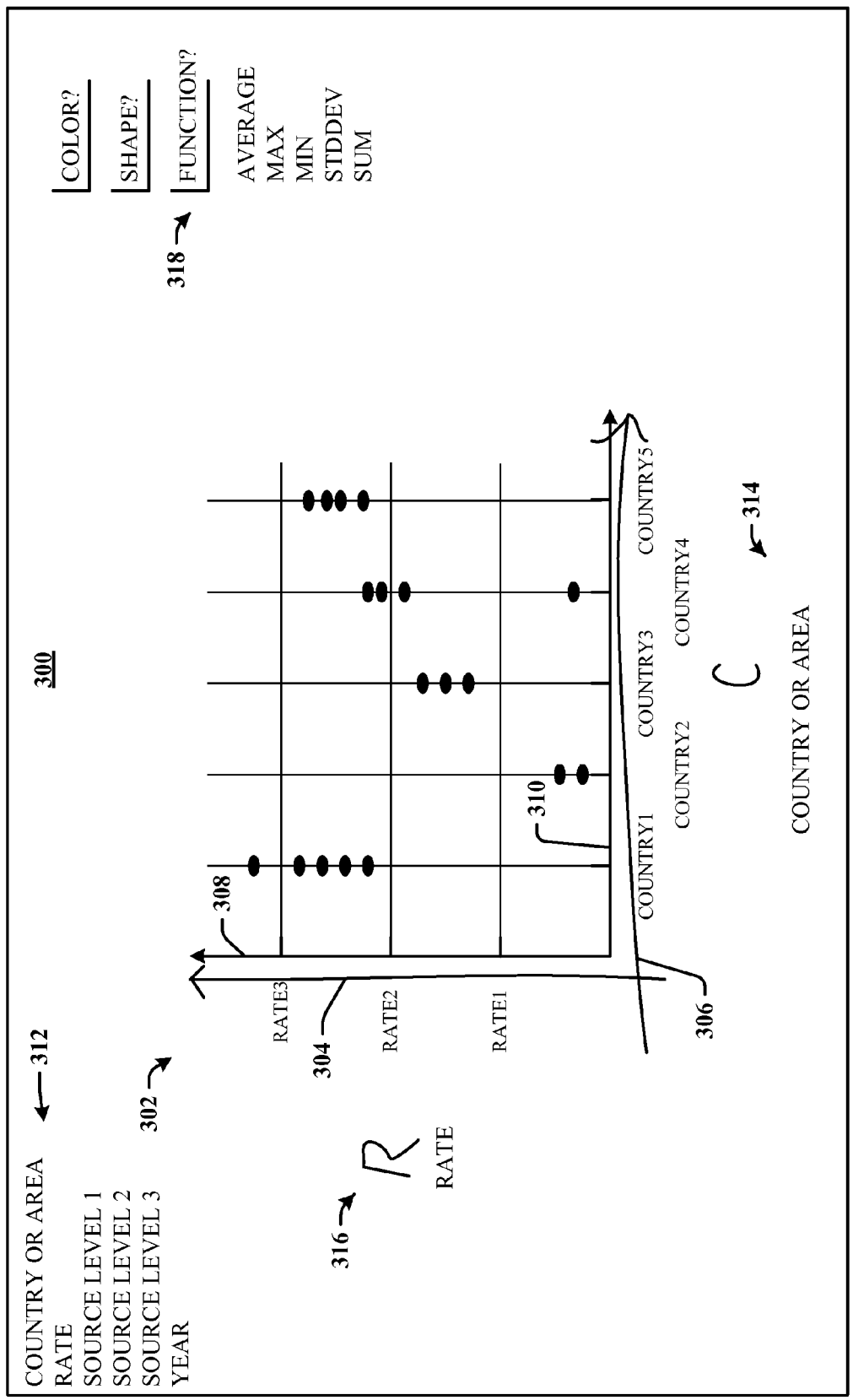
FIG. 3 illustrates sketch-based freeform input to a visualization surface in the form of hand strokes that represent axes and their labels for a graphical representation, which is a chart.
Figure 4:
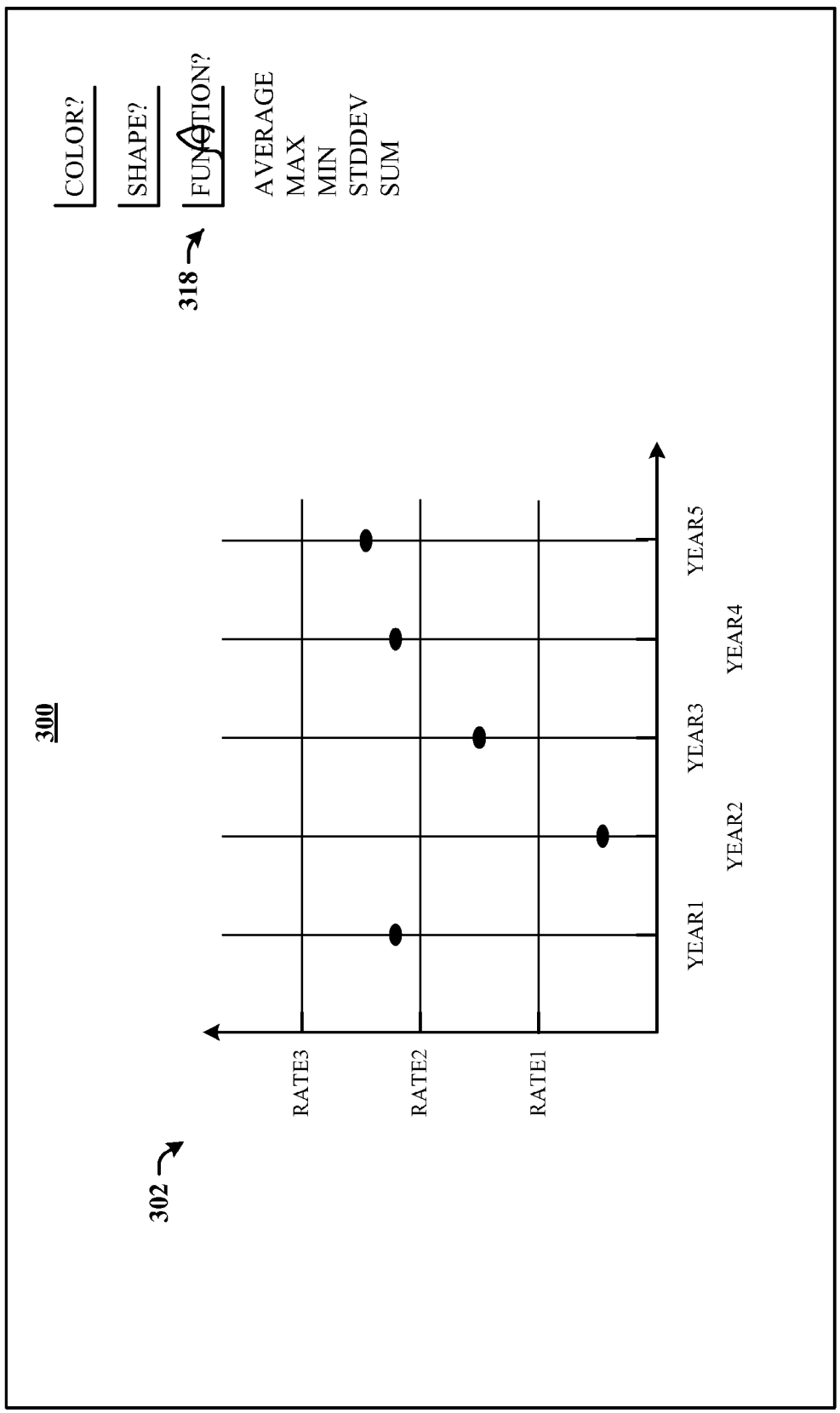
FIG. 4 illustrates user selection of a maximum of the data points by year.
Figure 5:
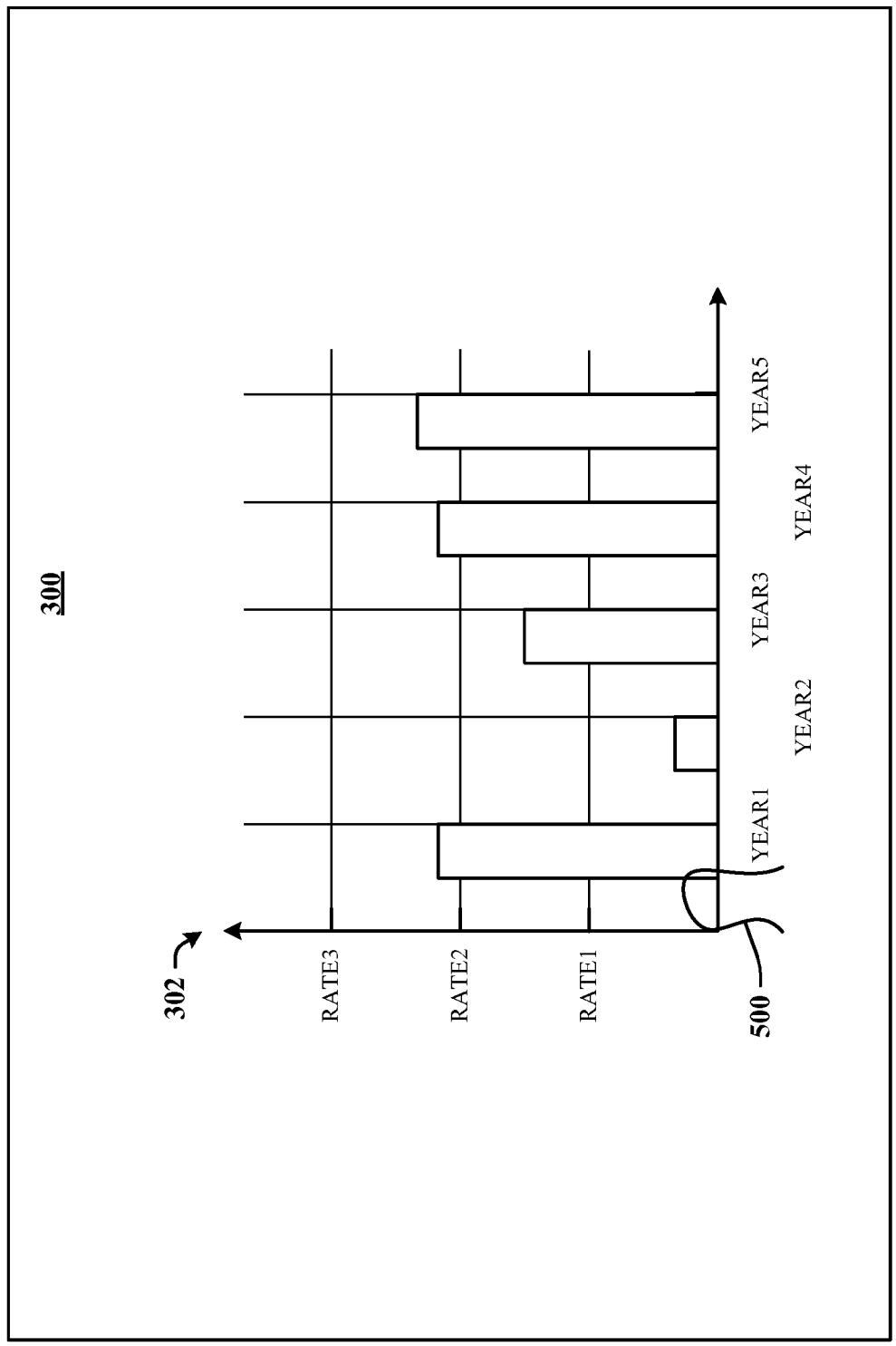
FIG. 5 illustrates a bar chart automatically created based on suggested user freeform input.

FIGS. 3-5 are an example series of illustrations that depict various stages of user interaction and system/method actions for graphical representations in accordance with the disclosed architecture.

FIG. 3 illustrates sketch-based freeform input to an interactive surface 300 in the form of hand strokes that represent axes for a graphical representation, which is a chart 302. Initially, the user scribes (sketches) a vertical stroke 304 and an intersecting horizontal stroke 306 (or vice versa), the intersection of which is recognized by a chart recognizer as x-y axes for the chart 302. Note that the use of intersecting input strokes is just one technique for suggesting a chart or graph. For example, another technique can be to apply tic marks to an arrow. Other approaches can be utilized as desired. In response to the chart recognizer determining that the strokes (304 and 306) are suggested to be axes for the chart 302, the chart recognizer automatically draws machine-generated axes (308 and 310, shown in an offset manner for viewing). Alternatively, as previously mentioned, the rough user-created stroke can be captured and presented. Once the user roughly scribes the vertical stroke 304 and the horizontal stroke 306, the system automatically overlays input areas (not shown) for the X, Y, Color, and Shape around the hand drawn strokes (304 and 306).

The user can then choose to analyze the data by country, and perceives that "Country or Area" is an option in a list 312 of columns on the left of the surface 300. Accordingly, the user scribes a letter "C" in a label area 314 (which can be marked "X-Axis") next to the horizontal axis 310. The system recognizes the stroke as text, when the user lifts the input device (e.g., a light pen) and chooses "Country or Area" of the list 312 as the best choice for axis label. Labeled tic marks can then also appear (be applied) on the machine-generated x-axis 310 for a subset of the data values in that column.

If the user then wants product rates on the y-axis 308, the user scribes a letter "R" (for "Rate") in a label entry area 316 (e.g., marked "Y-Axis"). The system then labels the y-axis 308 as "Rate" and adds labeled tics (e.g., RATE1, RATE2, etc.) to the y-axis 308, spaced evenly across the range of values in the "Rate" column. Upon populating the x- and y-axes, the system then draws a point corresponding to each row by its values in each column (e.g., a row for COUNTRY1 that has a rate of RATE1 will be plotted accordingly).

If the user now desires to view the maximum rate for each country, the user can apply a maximum function over data for each country via a function menu 318. For example, the user finds the function menu 318 and draws a circular stroke around the function menu item "MAX" to select a maximum function. In response, the system will then present each country by a single point (not shown).

Note that the user can manually write the word "function" or draws a gesture to specify function on the interactive surface 300, which is then recognized and interpreted to result in the interactive function menu to be presented by the computation component. Similarly, the user can manually write the word "color" or draws a gesture for color on the interactive surface 300, which is then recognized and interpreted to result in the interactive color menu to be presented by the computation component.

FIG. 4 illustrates user selection of an average of the data points by year. Here, the internal annotations are exposed to the user as label menus that include color, shape, function, etc. The function label menu expands out to expose the types of functions such as average (AVERAGE), maximum (MAX), minimum (MIN), standard deviation (STDDEV) and sum (SUM). Other functions can be employed as well.

If the user now wishes to see the average rate for each country, the user can erase the selection stroke encircling "MAX", and instead, sketch a letter "A" in over the function menu. The system immediately recognizes the text as indicating the selection of the choice "AVERAGE", and then distills each country's data points down to the average of all the rates for that country.

Additionally, the user can then alter the chart 302 to see the rate per year. Thus, the user begins sketching the letters "year" in the x-axis area after erasing the letter "C" used to specify COUNTRY OR AREA, and the system recognizes the sketches and changes the x-axis dimension from country to year. The system automatically re-processes the user data to meet the chart axis dimensions and gradations.

The user can choose to see the data in the form of a bar chart. For example, the user can scribe a partial rectangle 500 intersecting the x-axis (the general shape of a "bar"), whereupon the small circles making up each point in FIG. 4 are erased, and replaced with a bar. FIG. 5 illustrates a bar chart automatically created based on suggested user freeform input. Note that the user can switch to a bar chart even when there are multiple y-axis values. Switching the style of chart in traditional tools typically requires traversing a set of menus and windows. In contrast, and in accordance with the disclosed architecture, the data changes its representation in-place, thereby allowing users to stay focused on the data, rather than the interaction method.

Figure 6:
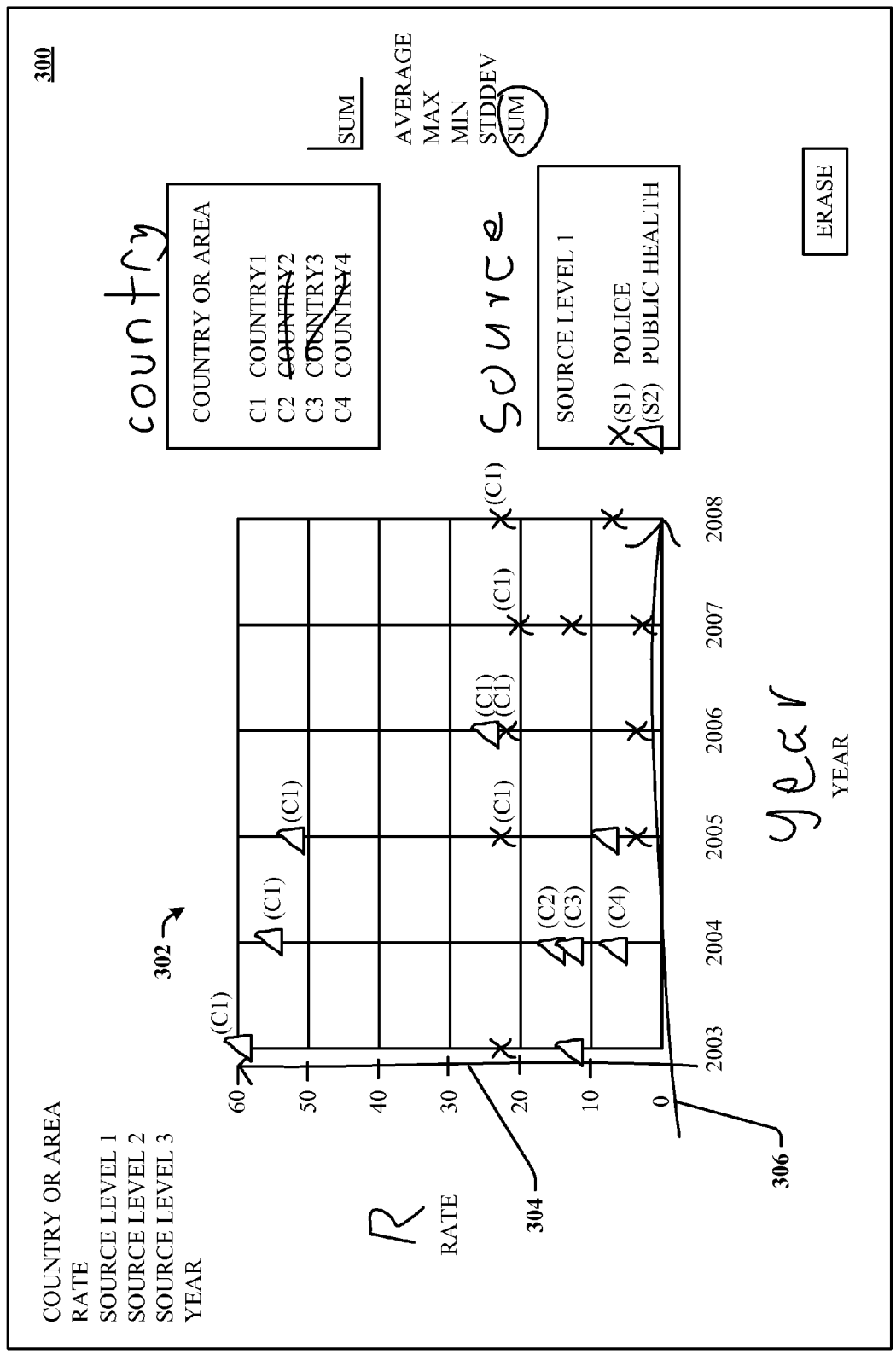
FIG. 6 illustrates the use of colors and shapes.

FIG. 6 illustrates the use of colors and shapes. The user can examine the list of column names as listed on the right column of FIG. 4, and choose to write a "C" in the text-entry box marked "Color?" This text is recognized as "Country or Area", as indicated in the surface 300 of FIG. 6, and the unique values in that data column ("Country1," "Country2," etc.) are populated below the label (Country or Area), each listed next to a color box (for colors C1, C2, C3, etc.). Concurrently, each point (corresponding to a row in the dataset) is colored according to that row's value in the "Country or Area" column (e.g., Country1 as color C1, Country2 as color C2, etc.).

Referring again to FIG. 4, as the user continues by scribing a letter "S" in the label area marked "Shape?", the unique values in the "Source Level 1" column (e.g., "Police" and "Public Health") of FIG. 6 are populated beneath the label, each next to a small glyph corresponding to that value's symbol (e.g., Symbol S1, and symbol S2), and the points in the scatter plot retain their color from the previous operation, but change shape according to the shape legend axis.

Generally, in accordance with FIG. 6, the user enters the vertical stroke 304 and the intersecting horizontal stroke 306. The system automatically recognizes intersection as suggesting axes for the chart 302. Additionally, for axis dimensions, freeform input such as an "R" for rate on the vertical stroke 304 is recognized as text, and the system automatically inserts RATE proximate the vertical stroke 304 (or axis 308). Similarly, the freeform strokes to spell "year" are inserted proximate the horizontal stroke 306 (or axis 310), which strokes are interpreted (recognized) by the text recognizer as YEAR, and accordingly, the term YEAR is presented in the visualization surface 300 along the horizontal stroke 306.

Where the user wants to explore a dataset that charts the product rates of several different countries over the years in the 1990's and 2000's, the user begins by selecting to load the user dataset into the tool (the disclosed architecture).

Once the dataset is loaded, the user can then draw the strokes (304 and 306) on the visualization surface 300 (e.g., a pen-based tablet), and the system automatically retrieves and presents annotations related to the chart 302 for user interaction. Once the user roughly scribes the vertical axis gradations (also referred to as tic marks or tics) and the horizontal gradations, the system automatically overlays input areas for the X, Y, Color (C1=color 1), and Shape (shape S1=X, and shape S2=Δ) axes around the hand drawn axes.

Since the interface is fit to the user strokes (304 and 306), the user can just as easily draw multiple small charts, a single large chart, or any combination of charts that the user desires. (In traditional tools, viewing multiple charts at once is inefficient, since the interaction involves opening and arranging windows in a screen.)

Traditional tools require people to change modes from drawing to specify the mapping of columns to axes, either through a set of menus and windows, or by dragging a column value from a list. The disclosed architecture method of writing in axis labels provides a direct means of modifying the final graph and does not require any special knowledge about particular menu options.

The architecture also facilitates scaling and filtering. In order to view the differences in some closely clustered points, the user can choose to rescale the y-axis such that the lower rates are shown higher on the graph. This can be accomplished by sketching a small horizontal tic mark across the y-axis, which is initially labeled with the current value at that point on the axis and a box to prompt for text entry. The user can then scribe a scale value in the tic's text box, and the axis values rescale such that the scale spans from zero to the hand-drawn tic (of the scale value), and the remaining values form the scale value through the maximum value span the rest of the vertical axis.

Filtering may rescale the axis. The user can alternatively draw a short line through the text "Country2" in the color legend. Once the text is crossed out, the text turns a different color (e.g., red) to indicate that value is now filtered, and the points that have "Country2" as their "Country or Area" are not drawn on the chart. The user can continue crossing out country labels either one at a time or with longer vertical strokes until only the points in which the user is interested remain. The y-axis scale fits the range zero to Country1's maximum value, and the user can clearly see the distinction between the two Rates.

In order to provide in-place chart modification, the user can erase strokes as desired. The user can either tap an "Erase" button of the surface 300, or press a barrel button on the pen, for example, to enter an erase mode. While in this mode, the screen can be configured to turns a different color (e.g., red) to represent the mode to the user, and any strokes the user crosses with the pen are removed from consideration in the chart 302. Lifting the pen exits erase mode.

At any point in the interactive process, the system can be storing the current state of the user inputs as well as the rendered graphical view. This can be initiated manually or configured to be performed automatically. Thus, the user can, at a later time, retrieve the stored graphical view for further user interaction(s).

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 7:
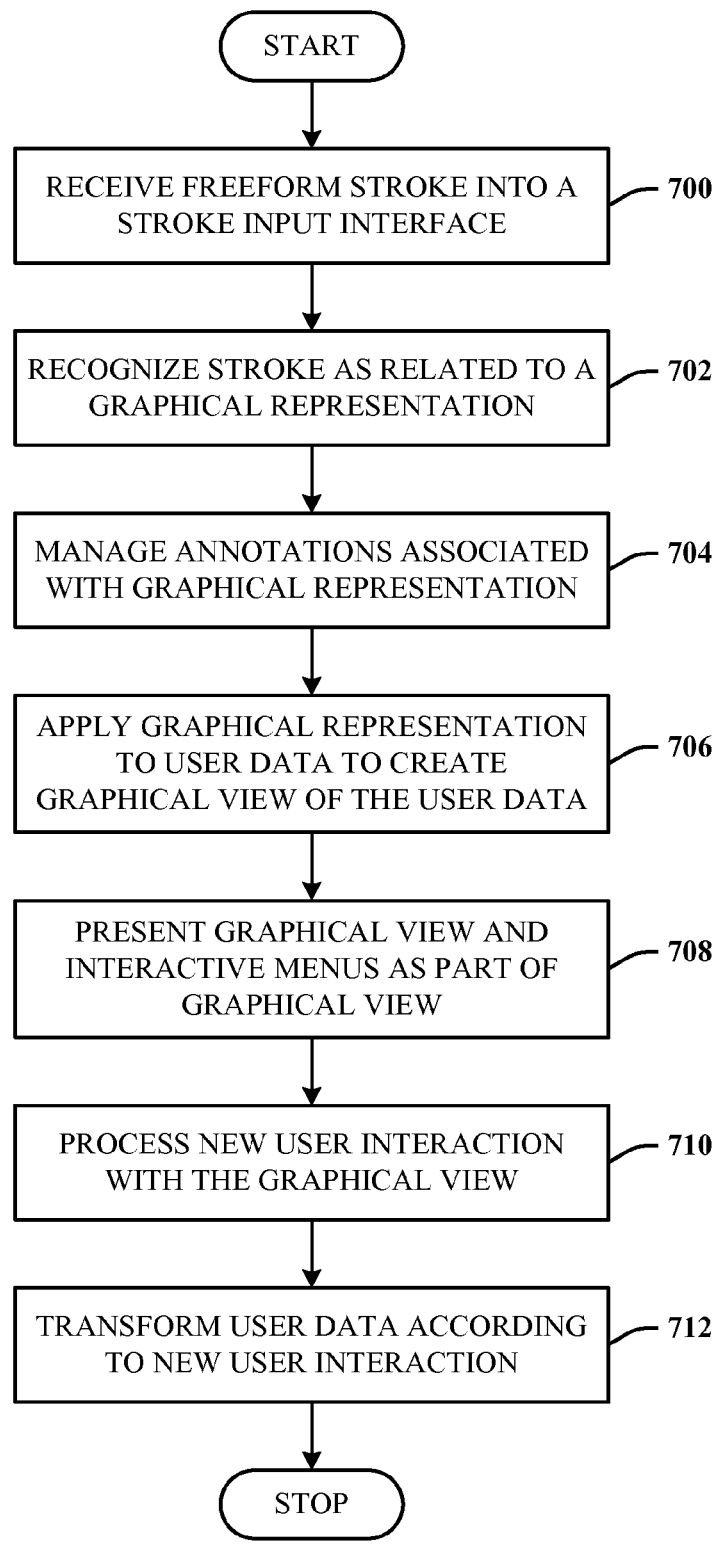
FIG. 7 illustrates a computer-implemented method in accordance with the disclosed architecture.

FIG. 7 illustrates a computer-implemented method in accordance with the disclosed architecture. At 700, a freeform stroke is received into a stroke input interface. The input can be a manually-entered user stroke applied to a digital whiteboard, for example, or a touch screen, etc. At 702, the stroke is recognized as related to a graphical representation. The stroke is recognized (through one or more recognizers) and mapped to a graphical representation such as a graph, chart, arrow, etc. At 704, annotations associated with the graphical representation are managed. At 706, the graphical representation is applied to user data to create a graphical view of the user data. At 708, the graphical view and interactive menus are presented as part of the graphical view. The presentation can be via the interactive component (e.g., computer display, projected onto a whiteboard, etc.).

At 710, a new user interaction with the graphical view is received and processed. In other words, if the user changes the scale or dimensions on axes of a graph, the data is automatically re-calculated to fit the graph. At 712, the user data is transformed according to the new user interaction. For example, the user data is transformed from a bar chart to a pie chart, or based on a detailed view of a segment of the bar chart, etc.

Figure 8:
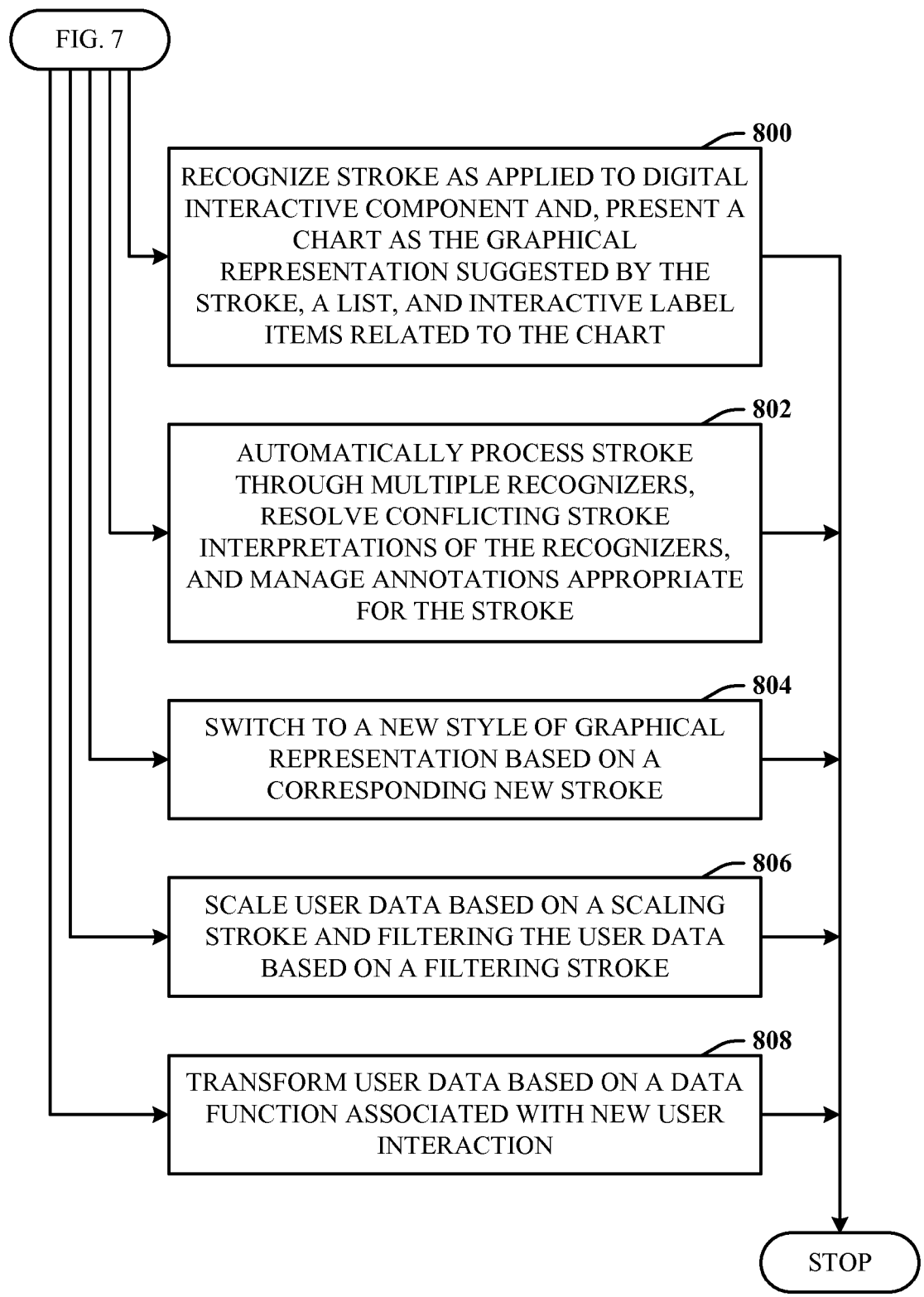
FIG. 8 illustrates further aspects of the method of FIG. 7.

FIG. 8 illustrates further aspects of the method of FIG. 7. Note that the flow indicates that each block can represent a step that can be included, separately or in combination with other blocks, as additional aspects of the method represented by the flow chart of FIG. 7. At 800, the stroke is recognized as applied to a digital interactive component and, a chart is presented as the graphical representation suggested by the stroke, a list is presented, and interactive label items are presented related to the chart. At 802, the stroke is automatically processed through multiple recognizers, conflicting stroke interpretations of the recognizers are resolved, and annotations appropriate for the stroke are managed. At 804, a new style of graphical representation is switched to based on a corresponding new stroke. At 806, the user data is scaled based on a scaling stroke and the user data is filtered based on a filtering stroke. At 808, the user data is transformed based on a data function associated with the new user interaction.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 9:
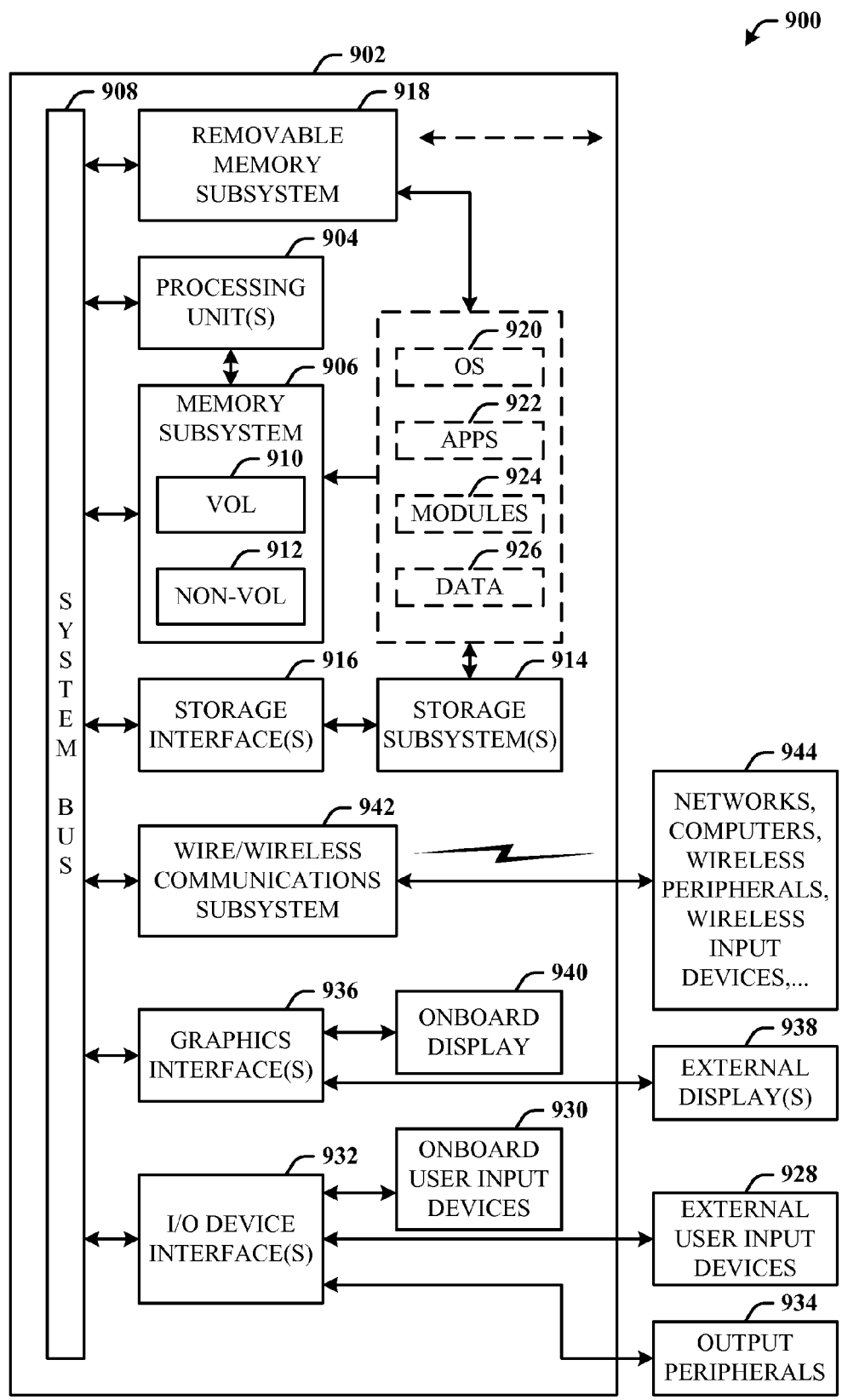
FIG. 9 illustrates a block diagram of a computing system that executes sketch-based interaction with computer-aided data analysis in accordance with the disclosed architecture.

Referring now to FIG. 9, there is illustrated a block diagram of a computing system 900 that executes sketch-based interaction with computer-aided data analysis in accordance with the disclosed architecture. In order to provide additional context for various aspects thereof, FIG. 9 and the following description are intended to provide a brief, general description of the suitable computing system 900 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 900 for implementing various aspects includes the computer 902 having processing unit(s) 904, a computer-readable storage such as a system memory 906, and a system bus 908. The processing unit(s) 904 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 906 can include computer-readable storage (physical storage media) such as a volatile (VOL) memory 910 (e.g., random access memory (RAM)) and non-volatile memory (NON-VOL) 912 (e.g., ROM, EPROM, EEPROM, etc.). A basic input/output system (BIOS) can be stored in the non-volatile memory 912, and includes the basic routines that facilitate the communication of data and signals between components within the computer 902, such as during startup. The volatile memory 910 can also include a high-speed RAM such as static RAM for caching data.

The system bus 908 provides an interface for system components including, but not limited to, the system memory 906 to the processing unit(s) 904. The system bus 908 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 902 further includes machine readable storage subsystem(s) 914 and storage interface(s) 916 for interfacing the storage subsystem(s) 914 to the system bus 908 and other desired computer components. The storage subsystem(s) 914 (physical storage media) can include one or more of a hard disk drive (HDD), a magnetic floppy disk drive (FDD), and/or optical disk storage drive (e.g., a CD-ROM drive DVD drive), for example. The storage interface(s) 916 can include interface technologies such as EIDE, ATA, SATA, and IEEE 1394, for example.

One or more programs and data can be stored in the memory subsystem 906, a machine readable and removable memory subsystem 918 (e.g., flash drive form factor technology), and/or the storage subsystem(s) 914 (e.g., optical, magnetic, solid state), including an operating system 920, one or more application programs 922, other program modules 924, and program data 926.

The operating system 920, one or more application programs 922, other program modules 924, and program data 926 can include the entities and components of the system 100 of FIG. 1, the entities and components of the system 200 of FIG. 2, the entities and components of the diagrams of FIGS. 3-6, and the methods represented by the flowcharts of FIGS. 7 and 8, for example.

Generally, programs include routines, methods, data structures, other software components, etc., that perform particular tasks or implement particular abstract data types. All or portions of the operating system 920, applications 922, modules 924, and/or data 926 can also be cached in memory such as the volatile memory 910, for example. It is to be appreciated that the disclosed architecture can be implemented with various commercially available operating systems or combinations of operating systems (e.g., as virtual machines).

The storage subsystem(s) 914 and memory subsystems (906 and 918) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 902 and includes volatile and non-volatile internal and/or external media that is removable or non-removable. For the computer 902, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 902, programs, and data using external user input devices 928 such as a keyboard and a mouse. Other external user input devices 928 can include a microphone, an IR (infrared) remote control, a joystick, a game pad, camera recognition systems, a stylus pen, touch screen, gesture systems (e.g., eye movement, head movement, etc.), and/or the like. The user can interact with the computer 902, programs, and data using onboard user input devices 930 such a touchpad, microphone, keyboard, etc., where the computer 902 is a portable computer, for example. These and other input devices are connected to the processing unit(s) 904 through input/output (I/O) device interface(s) 932 via the system bus 908, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 932 also facilitate the use of output peripherals 934 such as printers, audio devices, camera devices, and so on, such as a sound card and/or onboard audio processing capability.

One or more graphics interface(s) 936 (also commonly referred to as a graphics processing unit (GPU)) provide graphics and video signals between the computer 902 and external display(s) 938 (e.g., LCD, plasma) and/or onboard displays 940 (e.g., for portable computer). The graphics interface(s) 936 can also be manufactured as part of the computer system board.

The computer 902 can operate in a networked environment (e.g., IP-based) using logical connections via a wired/wireless communications subsystem 942 to one or more networks and/or other computers. The other computers can include workstations, servers, routers, personal computers, microprocessor-based entertainment appliances, peer devices or other common network nodes, and typically include many or all of the elements described relative to the computer 902. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 902 connects to the network via a wired/wireless communication subsystem 942 (e.g., a network interface adapter, onboard transceiver subsystem, etc.) to communicate with wired/wireless networks, wired/wireless printers, wired/wireless input devices 944, and so on. The computer 902 can include a modem or other means for establishing communications over the network. In a networked environment, programs and data relative to the computer 902 can be stored in the remote memory/storage device, as is associated with a distributed system. It will be appreciated that the network connections shown are exemplary and other means of establishing a communications link between the computers can be used.

The computer 902 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An interactive system, comprising:
    a digital interactive component that receives user interaction;
    a computation component that interprets the user interaction as related to a graph or chart, manages an annotation associated with the graph or chart, and performs an operation on user data based on the user interaction, to create a graphical view of the user data, wherein when user interaction is received that changes a style of the graph or chart, the user data is automatically recalculated and transformed to create a transformed graph or chart to fit the graphical view;
    a presentation component that presents the graphical view in association with the user interaction and the digital interactive component; and
    a processor that executes computer-executable instructions associated with at least one of the digital interactive component, computation component, or the presentation component.

2. The system of claim 1, further comprising a recognition component that includes one or more recognizers that processes the user interaction for association with a graphical representation.

3. The system of claim 2, further comprising a rendering component that includes one or more renderers that render state defined in the annotation.

4. The system of claim 1, wherein the digital interactive component and computation component facilitate multiple concurrent user interactions and corresponding graphical representations to be presented.

5. The system of claim 1, wherein the user interaction is interpreted to change the graph or chart based on symbols or gestures, transform the user data by applying a function, and filter the user data by removing a menu item from consideration.

6. The system of claim 1, wherein the graphical view with the raw stroke is storable and retrievable for subsequent user interactions.

7. The system of claim 1, wherein the user interaction includes a first stroke and a second stroke that when processed presents the user data as part of a new graphical view suggested by a combination of the first stroke and the second stroke.

8. The system of claim 1, wherein concurrent processing of the multiple strokes from multiple corresponding input modalities operates on the graphical view and associated user data to generate a new graphical view of the user data.

9. The system of claim 1, wherein the user interaction is a freeform stroke applied directly to the digital interactive component and the presentation component projects the graph or chart onto the digital interactive component in real-time in response to the user interaction.

10. An interactive system, comprising
    a digital interactive component that receives user interaction as a stroke applied directly thereto;
    a recognition component that recognizes the stroke and manages annotations associated with a set of strokes;
    a rendering component that renders state defined in an annotation;
    a data analysis and processing component that performs an operation on user data based on a graph or chart to create a graphical view of the user data, wherein when user interaction is received that changes a style of the graph or chart, the user data is automatically recalculated to create a transformed graph or chart to fit the graphical view;
    a presentation component that presents the graphical view of the user data in association with the stroke and the digital interactive component; and
    a processor that executes computer-executable instructions associated with at least one of the digital interactive component, recognition component, the rendering component, data analysis and processing component, or the presentation component.

11. The system of claim 10, wherein the presentation component projects the graphical view, and a characterization of the user data based on the graph or chart onto the digital interactive component in real-time response to the user interaction.

12. The system of claim 10, wherein the user interaction is a freeform stroke that suggests at least one of a legend, menu, scaling, filtering, colorization, data transformation, or erasure.

13. The system of claim 10, wherein the user interaction is interpreted and recognized to enable analysis of the user data, the user interaction is processed to enable change of the graph or chart based on symbols or gestures, transformation of the user data via a function, and filtering of the user data.

14. The system of claim 10, wherein the user interaction comprises a first stroke and a second stroke that when processed presents the user data as part of a new graphical view suggested by a combination of the first stroke and the second stroke.

15. A computer-implemented method, comprising acts of:
receiving a freeform stroke into a stroke input interface;
recognizing the stroke as related to a graph or chart, wherein recognizing the stroke comprises processing the stroke through multiple recognizers and resolving any conflicting stroke interpretations of the recognizers;
managing annotations associated with the graph or chart;
applying the graph or chart to user data to create a graphical view of the user data;
presenting the graphical view and interactive menus as part of the graphical view;
processing a new user interaction with the graphical view that changes a style of the graph or chart;
automatically recalculating and transforming the user data to transform the graph or chart to the changed style according to the new user interaction to fit the graphical view; and
utilizing a processor that executes instructions stored in memory to perform at least one of the acts of receiving, recognizing, managing, applying, presenting, processing, or transforming.

16. The method of claim 15, further comprising recognizing the stroke as applied to a digital interactive component and, presenting the graph or chart suggested by the stroke, a list, and interactive label items related to the graph or chart.

17. The method of claim 15, wherein processing the stroke through multiple recognizers comprises automatically processing the stroke through multiple recognizers, resolving conflicting stroke interpretations of the recognizers, and managing the annotations appropriate for the stroke.

18. The method of claim 15, wherein automatically recalculating and transforming the user data to transform the graph or chart to the changed style comprises automatically recalculating and transforming the user data to transform a bar chart to a pie chart.

19. The method of claim 15, further comprising scaling the user data based on a scaling stroke and filtering the user data based on a filtering stroke.

20. The method of claim 15, further comprising transforming the user data based on a data function associated with the new user interaction.

* * * * *